United States Patent [19]

Tomita et al.

[11] Patent Number: 4,686,583
[45] Date of Patent: Aug. 11, 1987

[54] DROPOUT COMPENSATING APPARATUS USING A DIGITAL DELAY CIRCUIT

[75] Inventors: Masao Tomita, Neyagawa; Akio Hashima, Tsuzuki; Haruo Ohta, Neyagawa; Tadaaki Matsuo, Noriguichi, all of Japan

[73] Assignee: Matsushita Electric Industrial Co., Ltd., Kadoma, Japan

[21] Appl. No.: 662,453

[22] Filed: Oct. 17, 1984

[30] Foreign Application Priority Data

Oct. 18, 1983 [JP] Japan ................. 58-194559

[51] Int. Cl.$^4$ .............................................. H04N 5/76
[52] U.S. Cl. .................................... 358/336; 360/38.1
[58] Field of Search ............... 358/163, 314, 336, 337, 358/340; 360/38.1

[56] References Cited

U.S. PATENT DOCUMENTS

| | | | |
|---|---|---|---|
| 4,251,831 | 2/1981 | Kamath | 358/163 X |
| 4,315,331 | 2/1982 | Lemoine et al. | 358/336 X |
| 4,577,236 | 3/1986 | Takanashi | 358/337 X |

*Primary Examiner*—Robert L. Richardson
*Attorney, Agent, or Firm*—Wenderoth, Lind & Ponack

[57] ABSTRACT

A dropout compensating apparatus used in a video signal recording/reproducing apparatus employs a digital delay circuit such as a digital memory. An input video signal is converted to a digital signal by an A/D converter. The digital signal is applied via a first switch to the digital delay circuit where it is delayed by a specified period. The delayed digital signal is converted to a delayed video signal by a D/A converter. The delayed video signal is applied to a second switch. A dropout detector produces a dropout detected signal when a dropout occurs in the input video signal. The first switch normally passes the digital signal from the A/D converter and is responsive to the dropout detected signal for passing the delayed digital signal from the digital delay circuit back to the digital delay circuit. The second switch normally passes the input video signal as it is and is also responsive to the dropout detected signal for passing the delayed video signal from the D/A converter.

5 Claims, 4 Drawing Figures

DROPOUT COMPENSATING APPARATUS USING A DIGITAL DELAY CIRCUIT

BACKGROUND OF THE INVENTION

1. Field of the Invention

This invention relates to a dropout compensating apparatus used for a video signal recording/reproducing apparatus such as a video tape recorder and a video disc player, for compensating a dropout contained in a video signal reproduced from a recording medium.

2. Description of the Prior Art

Recently, the video signal recording/reproducing apparatus such as video tape recorders (VTR) and video disc players have been provided with a dropout compensating unit which substitute a reproduced video signal having a dropout portion with a signal one horizontal (1 H) scanning period before by using the line correlation of television (TV) picture. FIG. 1 shows a block diagram of the dropout compensating unit which has been widely used. A frequency modulated (FM) video signal reproduced from a reproducing head is fed to an input terminal 1, and, when contains no dropout portion, is passed through an input terminal of an electronic switch 2, the electronic switch 2, and the output terminal 9 of the electronic switch 2 to a demodulator 5. When the reproduced FM video signal contains a dropout portion, a dropout detector 3 detects the dropout and controls the switch 2 to connect another input terminal 8 of the switch 2 to the output terminal 9. The input terminal 8 is applied with an output signal of an one horizontal period (1 H) delay line 4 which delays the signal from the output terminal 9 by 1 H. Thus the reproduced FM video signal containing a dropout portion is not applied to the demodulator 5, but instead, the 1 H previously reproduced FM video signal is applied to the demodulator 5. Accordingly, the demodulator 5 is always applied with FM video signals containing no dropout portions and demodulates and outputs the same at an output terminal 6.

However, the 1 H delay line is an analog delay line usually composed of a glass delay line, which is difficult to be small-sized. Further, when the dropout portion occupies the period longer than 1 H, the same video signal must be repeatedly circulated the loop composed of the switch 2 and the 1 H delay line 4 so that it is degraded (reduced in amplitude and bandwidth) due to the nonlinearity and insertion loss of the 1 H delay line 4.

SUMMARY OF THE INVENTION

Therefore, an object of the present invention is to provide a dropout compensating apparatus which performs dropout compensation without deteriorating signal quality (high S/N).

Another object of the present invention is to provide a dropout compensating apparatus which can compensate a dropout of long-duration.

Still another object of the present invention is to provide a dropout compensating apparatus which is small in size and power consumption.

These objects can be achieved by a dropout compensating apparatus comprising: analog to digital converting means for converting an input video signal to a digital signal; digital delay means for delaying the digital signal by a specified period; digital to analog converting means for converting the delayed digital signal to a delayed video signal; and means for substituting an input video signal containing a dropout by the delayed video signal containing no dropout, thereby to obtain a dropout compensated video signal.

A digital memory can be used as the digital delay means. The signal substituting means can be comprised by dropout detecting means responsive to an input video signal containing a dropout for producing a dropout detected signal and switch means responsive to the dropout detected signal for selectively passing a undelayed signal and a delayed signal.

Preferably, a low-pass filter may be employed for reducing the frequency band of the signal to be digitized so that the digital circuit elements may be simplified. Further the input video signal may be passed through the apparatus without being digitized unless it contains no dropout.

The above and other objects and features of the present invention will become apparent from the following description taken together with the accompanying drawings of the preferred embodiments.

DESCRIPTION OF THE PREFERRED EMBODIMENTS

Figure 1:
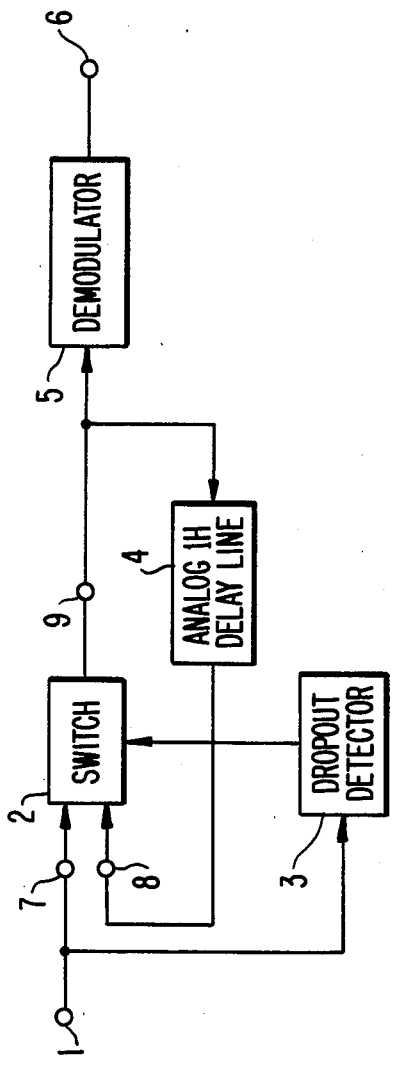
FIG. 1 is a block diagram of a typical conventional dropout compensating apparatus.
Figure 2:
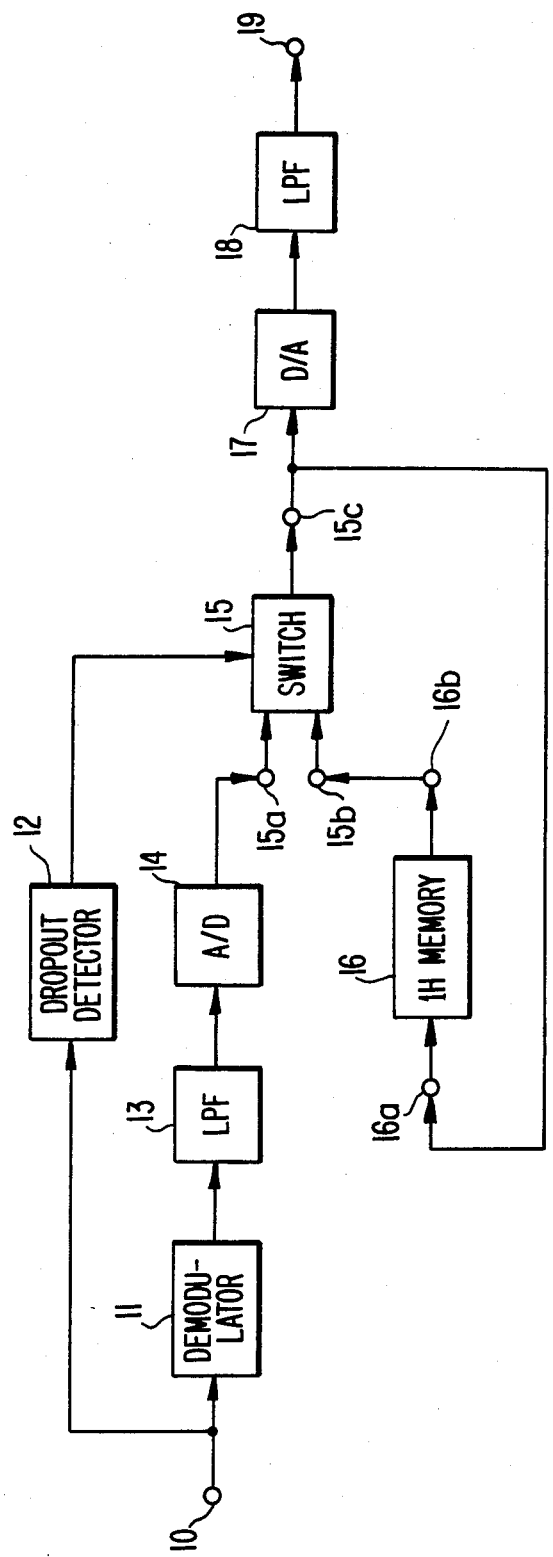
FIG. 2 is a schematic block diagram of a main part of an embodiment of a dropout compensator according to this invention.

FIG. 2 shows the first embodiment of this invention. In FIG. 2, reference numeral 10 denotes an input terminal for an input reproduced FM video signal, 11 a demodulator which demodulates the video signal, 12 a dropout detector which detects a dropout, 13 a low-pass filter which eliminates high-pass components of the demodulated video signal, 25 an A/D converter for digitizing the output of the low-pass filter 13, 15 an electronic switch which has two input terminals 15a and 15b and one output terminal 15c and is controlled by a dropout detected signal from the dropout detector 12. Reference numeral 16 denotes a 1 H memory which stores a digital signal corresponding to a video signal in 1 H (1 H video signal) and outputs a digital signal delayed by 1 H, 17 a D/A converter for reconverting a processed digital signal to an analog video signal, 18 a low-pass filter for eliminating unnecessary high-pass components of the analog video signal from the D/A converter 17, and 19 an output terminal of a dropout-compensated video signal.

When the reproduced video signal inputted to the input terminal 10 has no dropout, the switch 15 connects the output terminal 15c with the input terminal 15a. After having been demodulated by the demodulator 11, the reproduced video signal is removed of unnecessary high frequency components by the low-pass filter 13, converted digitally to a digital demodulated signal by the A/D converter 14, and is led to the output terminal 15c from the input terminal 15a through the switch 15. The digital signal is reconverted to the analog reproduced video signal by the D/A converter 17, removed of unnecessary high frequency components by the low-pass filter 18 and outputted from the output terminal 19. In this process, the digital signal at the output terminal 15c is also stored into the 1 H memory 16, and accordingly delayed by 1 H, appears at the output terminal 16b of the 1 H memory 16.

On the other hand, when the reproduced video signal inputted to the input terminal 10 has a dropout, the dropout detector 12 detects the dropout and controls the switch 15 to connect the output terminal 15c with the input terminal 15b. As the result, the signal delayed by 1 H by the memory 16 is applied to the D/A converter 17 in place of the video signal inputted at the time. Even when a dropout of more than 1 H duration was caused, the reproduced signal is delayed by n H (n denotes integer) in digital form without being deteriorated.

According to the FIG. 2 embodiment, the apparatus can be made remarkably more compact than the conventional apparatus using the glass delay line by employing a semiconductorized digital memory for the 1 H delay line. Also, a long-duration dropout can be compensated without deteriorating the original signal quality by employing the method of processing or delaying the digital form signal.

In the FIG. 2 embodiment, the demodulator 11 may be placed between the low-pass filter 18 and the output terminal 19 without losing the effects of the invention.

Figure 3:
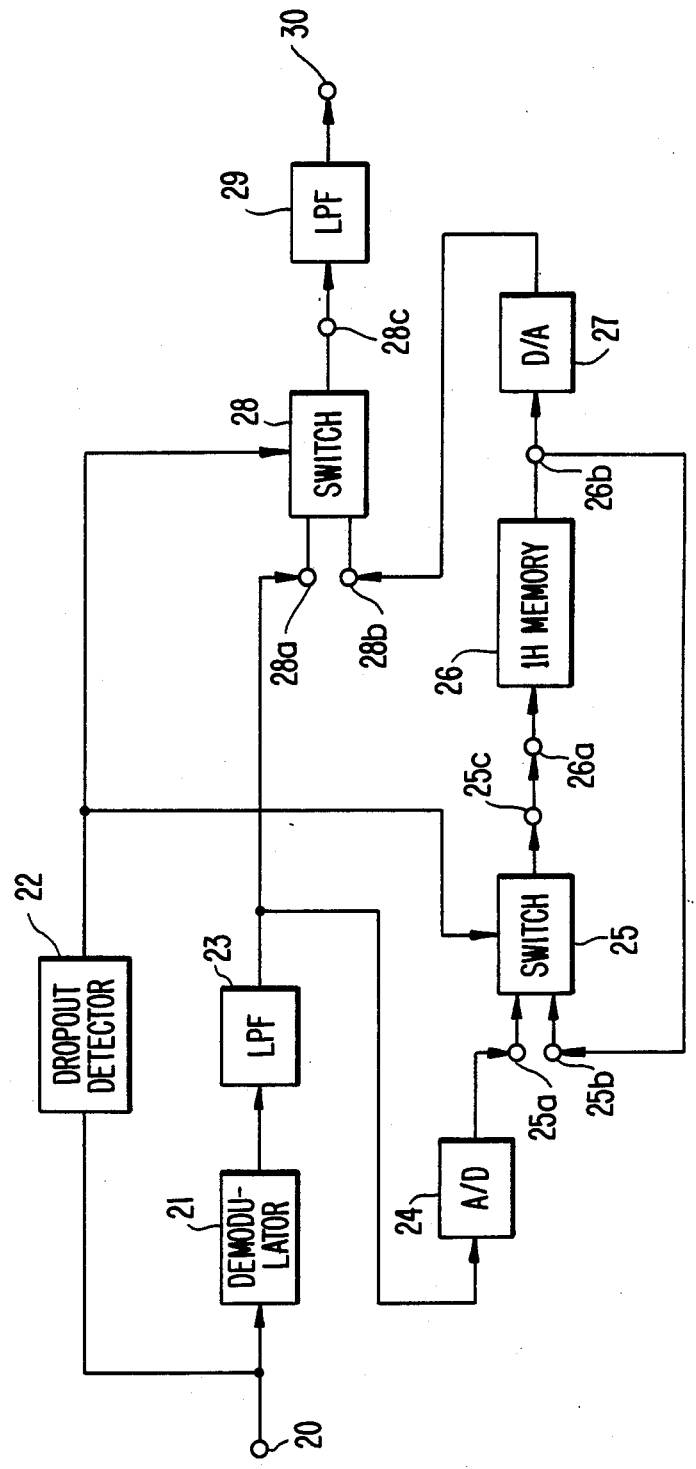
FIG. 3 is a schematic block diagram of a main part of another embodiment of the dropout compensator according to this invention.

FIG. 3 shows the second embodiment of the invention. In FIG. 3, reference numeral 25 denotes an electronic switch which has two input terminals 25a and 25b and one output terminal 25c. Reference numeral 20 denotes an input terminal of the reproduced video signal, 21 a demodulator, 22 a dropout detector, 23 and 29 low-pass filters, 24 an A/D converter, 26 a digital 1 H memory, 27 a D/A converter, and 30 an output terminal of the dropout-compensated signal, these elements respectively corresponding to 10, 11, 12, 13, 18, 14, 16, 17 and 19 in FIG. 4. The digital signal from the A/D converter 24 is applied to the input terminal 25a, and the digital signal from an output terminal 26b of the digital 1 H memory 26 is applied to the input terminal 25b. The output terminal 25c is connected to an input terminal 26a of the 1 H memory 26. The switch 25 is controlled by a dropout detected signal from the dropout detector 22. Reference numeral 28 denotes another electronic switch which has two input terminals 28a and 28b and one output terminal 28c. The analog demodulated video signal passed through the low-pass filter 23 is applied to the input terminal 28a and the analog signal (dropout eliminated signal) from the D/A converter 27 is applied to the input terminal 28b.

When the reproduced video signal inputted from the input terminal 20 has no dropout, the switch 28 allows the reproduced video signal to pass from the input terminal 28a to the output terminal 28c thereof. Therefore, the reproduced video signal demodulated by the demodulator 21 is led to the output terminal 30 through the low-pass filter 23, the switch 28 and the low-pass filter 29. That is, the reproduced analog signal is directly passed to the output terminal 30 without being digitized.

During this process, since the input terminal 25a and the output terminal 25c of the switch 25 are connected to each other, the output signal of the low-pass filter 23 is also converted to a digital signal by the A/D converter 24 and this digital signal is inputted to the 1 H memory 26 through the switch 25. There, the digital signal is delayed by 1 H. This 1 H delayed digital signal is reconverted to an analog video signal by the D/A converter 27 and applied to the input terminal 28b of the switch 28.

On the other hand, when the input reproduced video signal has a dropout portion, the input terminal 28b and the output terminal 28c of the switch 28 are connected with each other in response to the dropout detected signal from the dropout detector 22. As a result, the 1 H-delayed video signal at the terminal 28b passes through the switch 28 to the terminal 28c, and is removed of unnecessary high frequency components by the low-pass filter 29 and outputted as a dropout compensated video signal from the output terminal 30. Thus, the dropout can be compensated. In this process, since the input terminal 25b and the output terminal 25c of the switch 25 are connected to each other, the 1 H-delayed digital signal outputted from the 1 H memory 26 is inputted again to the same 1 H memory 26 through the switch 25. Therefore, signals are not deteriorated because of the digital signal processing even when a long-duration dropout is caused.

According to the second embodiment of the invention, a desired reproduced video signal can be obtained due to such a construction that allows direct output without digitizing the reproduced analog video signal when there is no dropout, and the S/N ratio not to be deteriorated by quantizing noises by digitization when there is a dropout. Therefore, a circuit scale can be remarkably reduced because both the A/D converter 24 and the D/A converter 27 can be of low resolution (i.e. high frequency components are eliminated from the signal to be converted).

Figure 4:
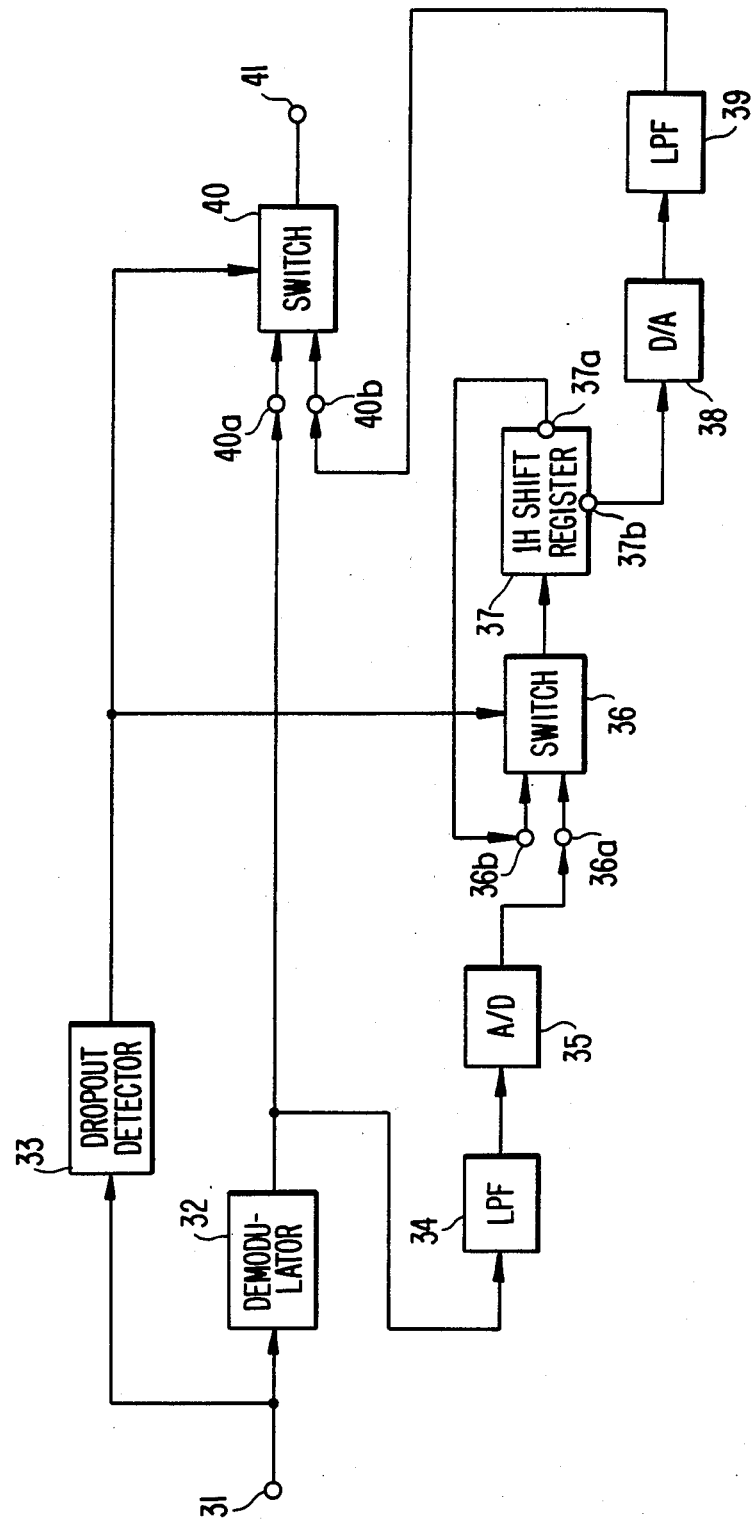
FIG. 4 is a schematic block diagram of a main part of still another embodiment of the dropout compensator according to this invention.

FIG. 4 shows the third embodiment of the invention. In FIG. 4, Reference numeral 31 denotes an input terminal of the reproduced video signal, 32 a demodulator, 33 a dropout detector, 40 a switch, and 41 an output terminal for the dropout-compensated reproduced video signal, these elements corresponding to 20, 21, 22, 28 and 30 in the second embodiment. Reference numeral 34 denotes a low-pass filter which limits the frequency band of the reproduced video signal to be delayed, 35 an A/D converter, 36 a switch which has two input terminals 36a and 36b. The output digital signal of the A/D converter 35 is applied to the input terminal 36a, and an output digital signal from an output terminal 37a of a 1 H shift register 37 is applied to the input terminal 36b. The shift register 37 has the output terminal 37a for the 1 H-delayed digital signal and an intermediate tap output terminal 37b. Reference numeral 38 denotes a D/A converter, and 39 a low-pass filter which limits the output signal band of the D/A converter 38. The intermediate tap output terminal 37b of the shift register 37 is located so that the signal inputted to the low-pass filter 34 is delayed by just 1 H by the time it is outputted from the low-pass filter 39. In other words, the delayed time difference at the terminals 37a and 37b is determined so as to compensate the time delays occurr in such circuit elements as the low-pass filters 34 and 39, the A/D converter 35 and the D/A converter 38.

In this embodiment, when the reproduced video signal inputted to the input terminal 31 has no dropout, the reproduced video signal is led to the output terminal 41 through the input terminal 40a of the switch 40 after being demodulated by the demodulator 32. Therefore, the signal appearing at the output terminal 41 is a desired reproduced video signal without being digitized and limited of its band. During this process, the signal demodulated by the demodulator 32 is limited of its frequency band by the low-pass filter 34, and converted to a digital signal by the A/D converter 35. This digital signal is delayed by the 1 H shift register 37 after passed through the switch 36 from the input terminal 36a thereof. The delayed signal outputted from the intermediate tap output terminal 37b is reconverted to the analog video signal by the D/A converter 38. The reconverted analog video signal is removed of unnecessary components by the low-pass filter 39, and applied to the input terminal 40b of the switch 40. Since the intermediate tap output terminal 37b of the 1 H shift register 37 is located at the position where the properly delayed signal is obtained in consideration of signal delays caused by the low-pass filters 34 and 39, the A/D converter 35 and the D/A converter 38, the signal at the input terminal 40b is delayed by just 1 H than the signal at the input terminal 40a.

The bandwidth of the dropout compensated signal may be limited to about 1.5 MHz without causing no visual problems. Consequently, by limiting the frequency band by the low-pass filters 34 and 39, the size and power consumption of the circuit from the A/D converter 35 to the D/A converter 38 can be remarkably reduced.

On the other hand, when the reproduced video signal inputted to the input terminal 31 has a dropout portion, the dropout detector 33 detects the dropout and produces a dropout detected signal for controlling the switch 40 so as to pass the signal at the input terminal 40b to the output terminal 41. That is, the 1 H-delayed video signal is outputted from the output terminal 41, so that the dropout is compensated. During this process, the switch 36 is so positioned to pass the 1 H delayed signal at the output terminal 37a of the 1 H shift register 37 again to the input terminal of the same 1 H shift register 37. This state is maintained until an input reproduced video signal containing no dropout is detected by the dropout detector 33. Even if a dropout of more than 1 H duration occurred, the repeatedly delayed signal will not be deteriorated because it is delayed as a digital signal.

According to the third embodiment of the invention, which limits the frequency band of the delayed signal by means of the low-pass filters, the scale of the circuit comprised of such as the A/D converter, memory (e.g. shift register) and D/A converter and the power consumed in the circuit can be reduced. Furthermore, a time delay caused by the circuit elements can be compensated by providing at the shift register the intermediate tap. Furthermore, when the long-duration dropout occurs, signal deterioration can be avoided by repeatedly delaying the 1 H-delayed digital signal for substituting the dropout containing reproduced video signal.

Although the shift register is used as the memory in the third embodiment, the same effects of the invention as above can be also obtained by such another construction that the switch 36 and the shift register 37 are replaced by a random access memory (RAM) which can store the 1 H digital signal, the reading addresses being shorter than the writing addresses (corresponding to the 1 H digital signal) by the time delay caused by the circuit elements. The writing operation is stopped when a dropout is detected to hold the signal 1 H before, which is read out for compensating the dropout.

In summarizing the effects of the above embodiments, the present invention can make the apparatus compact by semiconductorization of the digital memory used for delaying the reproduced video signal. Furthermore, a long-duration dropout can be compensated without signal deterioration by repeatedly delaying, circulating or holding the digital signal. Also, the reproduced video signal can be directly outputted without being digitized when no dropout occurred, but the dropout compensation by the digitized signal is performed only when a dropout occured. Thus, the circuit scale can be reduced by employing an A/D converter of comparatively low resolution. Further, since the frequency band of the delayed signal is limited by the low-pass filters, not only the scale of the circuit comprised by A/D converter, D/A converter, and memory, but also the power consumed in the circuit can be reduced. The time delay caused by the circuit elements such as A/D and D/A converters, and the low-pass filters can be easily compensated by using the memory which can output a signal which was delayed by a period shorter by the time delay than 1 H.

In the foregoing description, three preferred embodiments of the invention have been explained for the best understanding of the invention. However, various changes and modifications of the embodiments are possible without departing from the scope of the invention clearly defined in the appended claims.

What is claimed is:

1. A dropout compensating apparatus for eliminating a dropout contained in a video signal recording medium, comprising:
   analog to digital converting means for converting an input video signal to a digital signal;
   digital delaying means for delaying a digital signal by a specified period;
   dropout detecting means responsive to an input video signal containing a dropout for producing a dropout detected signal;
   digital to analog converting means for converting a delayed digital signal from said digital delaying means to a delayed video signal;
   first switch means having two input terminals respectively connected with an output terminal of said analog to digital converting means and an output of said digital delaying means and an output terminal connected with an input terminal of said digital delaying means, said first switch means being responsive to said dropout detected signal for selectively connecting the two input terminals with the output terminal thereof so that the digital delayed signal from the digital delaying means is applied to the input terminal of said digital delaying means only when the input video signal contains a dropout; and
   second switch means responsive to said dropout detected signal for selectively passing the input video signal and the delayed video signal from said digital to analog converting means so that the delayed video signal from said digital to analog converting means is passed through said second switch means only when the input video signal contains a dropout, thereby to obtain a dropout compensated video signal.

2. A dropout compensating apparatus according to claim 1, wherein said specified period is a one horizontal synchronizing period.

3. A dropout compensating apparatus according to claim 2, further comprising low-pass filters arranged respectively before said analog to digital converting means and after said digital to analog converting means for eliminating unnecessary high frequency components.

4. A dropout compensating apparatus according to claim 2, wherein said digital delaying means comprises a digital memeory which stores a digital signal corresponding to a video signal included in said specified period.

5. A dropout compensating apparatus according to claim 4, wherein the delay time of the delayed digital signal applied to said digital to analog converting means is shorter than said specified period.

* * * * *